UNITED STATES PATENT OFFICE.

NAPOLEON G. PETINOT, OF NEW YORK, N. Y., ASSIGNOR TO UNITED STATES ALLOYS CORPORATION, A CORPORATION OF NEW YORK.

ARTICLE OF MANUFACTURE, BEING AN ALLOY OF IRON, TITANIUM, AND SILICON, AND PROCESS FOR THE PRODUCTION THEREOF.

1,260,037. Specification of Letters Patent. Patented Mar. 19, 1918.

No Drawing. Application filed March 7, 1917. Serial No. 153,173.

*To all whom it may concern:*

Be it known that I, NAPOLEON G. PETINOT, a citizen of the United States of America, and a resident of the city, county, and State of New York, have invented a new and useful Article of Manufacture, Being an Alloy of Iron, Titanium, and Silicon, and Process for the Production Thereof.

My invention relates generally to an alloy for the treatment of ferro-metals and more particularly to an alloy for the removal of the imprisoned slag or oxids of any molten mass of ferro-metal.

The principal object of my invention has been to provide an alloy, which, on account of the proportions of its constituents and their chemical combinations, has certain valuable properties when used in the treatment of molten iron and steel including the removal of imprisoned slag or oxids therefrom.

It is well known to those skilled in the art, that the treatment of iron or steel, with ferro-titanium, greatly improves their properties. I have found, however, that in the regular practice of treating iron and steel with ferro-titanium, a certain amount of the titanium combines with oxygen existing in the iron and steel either as free oxygen or combined as oxids, and forms titanium-oxid. This titanium-oxid has a very high melting point and does not become fluid enough to be liberated from the molten mass at the temperature of the molten iron and steel, but only becomes pasty and is, therefore, more or less entrapped in the iron and steel, as such, or is combined with particles of slag in the metal.

I have discovered that by introducing silicon in the alloy in certain definite proportions and then using this alloy for the treatment of iron and steel, results are had which are superior to those heretofore attained.

I am aware that certain patents have been issued on alloys for the treatment of iron and steel where titanium and silicon are used, but in these particular patents it is the desire of the inventor to retain a certain portion of these materials in the finished product. In my process, I use an alloy which has just enough titanium and silicon in it to make the imprisoned slag or oxids fusible, and it is very important that the ratio between the silicon and titanium be exact or they will have a high melting point and the desired results will not be obtained.

I have found that iron or steel, which is treated with ferro-titanium and which contains at least 0.1 per cent. of silicon, results in a much better product than iron or steel which does not contain the silicon. The silicon in the iron or steel just referred to, is derived from ferro-silicon which, in present practice, is added to the ladle when the steel or iron is tapped from the furnace. Part of the silicon thus added is oxidized to silica, thus forming a slag which is left in the ladle after the steel or iron is poured off.

In the experiments which led to my invention, I took some of this silica or slag, found in the bottom of the ladle, after teeming a basic heat, reduced it to a fine powder and mixed with it 50 per cent. of pure titanic oxid. The melting point of this mixture, I discovered, was very high. I then made other mixtures of silica or slag and titanic oxid in which the amounts of silica varied from 10 per cent. to 50 per cent., and among these I found one with a low melting point. This latter mixture was one in which the weight of silica was 15 per cent. of the weight of the oxid.

I, therefore, made an alloy of iron, titanium and silicon so proportioned that, when it is used to treat a ferro-metal, the oxids thus formed are in such proportions that their mixture, when combined with any slag in the metal, is far more fusible than the mixtures obtained when the ferro-metal is treated with only ferro-titanium.

It should be observed that my invention does not have for its object to provide an alloy designed to effect the melting point of all of the slag of any mass of molten metal taken from the furnace, but merely that portion of the slag or oxids which are scattered throughout and imprisoned within the mass.

In carrying out my invention, if the alloy is used to treat steel, which contains iron oxid, the following reactions will take place, simultaneously:

$$Ti + 2FeO = 2Fe + TiO_2$$
$$Si + 2FeO = 2Fe + SiO_2$$

If the titanium and silicon are in proper proportions, the titanic oxid and silica formed will combine with the slag or oxids which are imprisoned in the mass of molten steel, thus forming silico-titanates, which have low melting points. These silico-titanates on account of their low melting points form relatively mobile liquids which readily escape from the molten steel, thus producing a superior steel. The treatment of steel with my alloy is far superior to the treatment of steel with ferro-titanium or ferro-silicon separately, because, with my alloy, the titanic oxid and silica are formed simultaneously, and in immediate proximity to one another and the slag or oxid which it is desired to remove from the molten metal.

As hereinbefore stated, it is essential that the proportions between the silicon and titanium be exact, for if the percentage of titanium is greater than a certain definite amount, the combination will have a high melting point. I have found that in order to successfully carry out my process, I must have an alloy which contains from 15 per cent. to 25 per cent. titanium, 3 per cent. to 5 per cent. silicon, and carbon in various amounts. In this alloy, the silicon exists as iron silicid and the carbon partly combined as a double carbid of iron and titanium and partly in the graphitic state. The graphitic carbon contained in the alloy is doubtless produced by the presence of the silicon, which, as is well known to metallurgists, tends to throw carbon out of the combination and into the graphitic state.

In making my alloy, I use a mixture of rutile containing 98 per cent. titanic oxid, quartz containing 98 per cent. silica and charcoal, 50 per cent. fixed carbon, and steel or iron scrap. The proportions of such mixture may be as follows:

Rutile _____ 25.5 pounds
Quartz _____ 25.5 pounds
Charcoal _____ 21 pounds
Scrap _____ 75 pounds I do not wish to be limited to these ingredients or the proportions above noted, as they are given only as an example, for I may use instead of the rutile, titaniferous iron ore containing 25 per cent. to 40 per cent. titanic oxid or ilmenite containing 55 per cent. titanic oxid, the balance in either case being iron oxid. With the last two suggested mixtures, a smaller amount of scrap would be used, because some of the iron would be derived from the reduction of the iron oxid in the titaniferous ore. I may also use some other form of iron instead of the scrap, as, for, instance, mill scale.

In making my alloy, the mixture is placed into a furnace of preferably the Siemens type; one, for example, consisting of a crucible made of carbon or graphite, and a carbon electrode. By using this type of furnace, I find that it is not necessary to add more carbon to the charge than that which is theoretically required to reduce the oxids, for any additional carbon required in the mixture will be supplied by the carbon electrode. I have found, by experience, that in making one ton of alloy, 300 pounds of carbon from the electrodes have been used. This method of adding the required carbon, I have found to be more satisfactory than putting into the original mixture an excess or carbon. The carbon particles supplied from the electrode are at such a high temperature that they react more readily with the oxids to be reduced, than if they were incorporated with the original mixture.

It will be noticed that in the mixtures hereinbefore given, there is no provision made for any slag forming materials, and those skilled in the operation of furnaces will realize, that, when reduction has occurred, nothing but metal will be left in the crucible. On account of the absence of a layer of slag, the operation of the furnace will be very unsteady. This, however, is intentional, for at the earlier stage of the smelting operation, the silica in the mixture combines with some of the iron oxid derived from either the ore or from the rust mixed with the scrap iron and forms a temporary slag. At the end of the operation, this slag is reduced by the carbon derived from the electrode and finally becomes such a thin layer that the arc is formed directly on the surface of the metal bath. At this time the working of the furnace becomes very unsteady and the molten metal is projected from the crucible, all of which indicates that the reaction is completed and that it is time to tap the finished alloy from the furnace.

Having thus described my invention, what I claim is:

1. An alloy of iron, titanium and silicon in which the ratio of titanium to silicon is not less than 80 parts of titanium to 20 parts of silicon and not more than 85 parts of titanium to 15 parts of silicon.

2. An alloy of iron, titanium and silicon embodying from 69 per cent. to 80 per cent. of iron combined with titanium and silicon, the silicon being in the proportion of about one quarter of the weight of the titanium.

3. The method of making an alloy of iron, titanium and silicon consisting in heating, in an electric furnace, a mixture containing iron in a greater quantity than the total quantity of all other ingredients, and that in such mixture, the ratio of titanium and silicon be not less than 80 parts of titanium to 20 parts of silicon and not more than 85 parts of titanium to 15 parts of silicon, together with a sufficient quantity of carbon to perform the reduction, whereby an iron bath and a slag of silico-titanates are formed, and the silicon and titanium are absorbed by the iron until the silico-titanates are completely reduced.

In testimony whereof, I have hereunto signed my name.

NAPOLEON G. PETINOT.